United States Patent
Chin

(10) Patent No.: US 6,690,938 B1
(45) Date of Patent: Feb. 10, 2004

(54) SYSTEM AND METHOD FOR REDUCING DROPPED CALLS IN A WIRELESS COMMUNICATIONS NETWORK

(75) Inventor: Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/306,230

(22) Filed: May 6, 1999

(51) Int. Cl.$^7$ ................................................. H04Q 7/20
(52) U.S. Cl. ........................ 455/450; 455/452; 455/455; 455/453
(58) Field of Search ................................. 455/450, 451, 455/452.1, 453, 436, 442, 443, 445, 455, 452.2

(56) References Cited

U.S. PATENT DOCUMENTS

| | | | |
|---|---|---|---|
| 4,112,257 A | 9/1978 | Frost ............................ 179/2 |
| 4,123,718 A | 10/1978 | Lampert et al. ............ 325/474 |
| 4,765,753 A | 8/1988 | Schmidt ...................... 379/60 |
| 4,777,653 A | 10/1988 | Bonnerot et al. ............ 455/69 |
| 4,811,421 A | 3/1989 | Havel et al. ................. 455/69 |
| 4,868,795 A | 9/1989 | McDavid et al. ............ 367/77 |
| 4,870,698 A | 9/1989 | Katsuyama et al. ......... 455/67 |
| 4,901,307 A | 2/1990 | Gilhousen et al. ............ 370/18 |
| 5,056,109 A | 10/1991 | Gilhousen et al. ............. 375/1 |
| 5,093,840 A | 3/1992 | Schilling ....................... 375/1 |
| 5,101,501 A | 3/1992 | Gilhousen et al. ............ 455/33 |
| 5,103,459 A | 4/1992 | Gilhousen et al. ............. 375/1 |
| 5,107,487 A | 4/1992 | Vilmur et al. ................. 370/18 |
| 5,128,965 A | 7/1992 | Henriksson .................. 375/58 |
| 5,204,876 A | 4/1993 | Bruckert et al. ............... 375/1 |
| 5,220,678 A | 6/1993 | Feei ............................ 455/69 |
| 5,245,629 A | 9/1993 | Hall .............................. 375/1 |
| 5,257,283 A | 10/1993 | Gilhousen et al. ............. 375/1 |
| 5,265,119 A | 11/1993 | Gilhousen et al. ............. 375/1 |
| 5,267,262 A | 11/1993 | Wheatley, III ................. 375/1 |
| 5,305,468 A | 4/1994 | Bruckert et al. ............... 455/69 |
| 5,383,219 A | 1/1995 | Wheatley, III et al. ......... 375/1 |
| 5,390,338 A | 2/1995 | Bodin et al. ................ 455/33.1 |
| 5,420,574 A * | 5/1995 | Erickson et al. ........ 340/825.03 |

(List continued on next page.)

FOREIGN PATENT DOCUMENTS

WO    9406218    3/1994

Primary Examiner—Erika Gary
(74) Attorney, Agent, or Firm—Philip Wadsworth; Kent Baker; Christopher O. Edwards

(57) ABSTRACT

A system and method for managing wireless communications system resources. The system includes a first mechanism that determines currently available wireless communications system traffic resources and provides a signal in response thereto. A second mechanism de-allocates wireless communications system supplemental resources and reallocates the supplemental resources as traffic resources in response to the signal. In a specific embodiment, the currently available wireless communications system traffic resources include currently available traffic channels, and the supplemental resources include supplemental channels. The first mechanism includes a mechanism that compares a number of in-use traffic channels with a number of total traffic channels and provides the signal when the difference between the number of total traffic channels and the number of in-use traffic channels is less than a predetermined threshold. The first mechanism further includes a mechanism that monitors when a call handoff request and/or a call origination request is blocked at a base station transceiver subsystem call resource manager and provides the signal when the call is blocked. The second mechanism includes a mechanism for sending a message to a selector bank subsystem radio link manager, receiving a response from the selector bank subsystem radio link manager and de-allocating the supplemental resources.

26 Claims, 6 Drawing Sheets

U.S. PATENT DOCUMENTS

| | | | |
|---|---|---|---|
| 5,450,616 A | 9/1995 | Rom | 455/69 |
| 5,465,399 A | 11/1995 | Oberholtzer et al. | 455/69 |
| 5,487,180 A | 1/1996 | Ohtake | 455/54.1 |
| 5,615,249 A * | 3/1997 | Solondz | 455/450 |
| 5,862,478 A * | 1/1999 | Cutler, Jr. et al. | 455/428 |
| 5,896,573 A * | 4/1999 | Yang et al. | 455/453 |
| 6,078,817 A * | 6/2000 | Rahman | 455/452 |
| 6,144,856 A * | 11/2000 | Ko | 455/436 |
| 6,212,389 B1 * | 4/2001 | Fapojuwo | 455/453 |
| 6,418,148 B1 * | 7/2002 | Kumar et al. | 370/468 |

* cited by examiner

SYSTEM AND METHOD FOR REDUCING DROPPED CALLS IN A WIRELESS COMMUNICATIONS NETWORK

BACKGROUND OF THE INVENTION

I. Field of Invention

This invention relates to wireless communications systems. Specifically, the present invention relates systems and methods for allocating traffic channels and supplemental channels in a base station or base station transceiver subsystem (BTS).

II. Description of the Related Art

Cellular telecommunications systems are characterized by a plurality of mobile stations (e.g. cellular telephones, mobile units, wireless telephones, or mobile phones) in communication with one or more base station transceiver subsystems (BTSs). Signals transmitted by the mobile stations are received by a BTS and often relayed to a mobile switching center (MSC) having a base station controller (BSC). The MSC, in turn, routes the signal to a public switched telephone network (PSTN) or to another mobile station. Similarly, a signal may be transmitted from the public switched telephone network to a mobile station via a base station or BTS and an MSC.

Each BTS covers a 'cell' within which a mobile station may communicate. A cell covers a limited geographic area and routes calls from mobile stations to and from a telecommunications network via an MSC. The coverage area of a typical cellular telecommunications system is divided into several cells. Different communications resources such as frequencies are often allocated to each cell to maximize communications system resources. When a mobile station moves from a first cell to a second cell, a handoff is performed to assign new system resources associated with the second cell.

A handoff involves the execution of a set of negotiation instructions between the mobile station and one or more governing BTSs and/or MSCs. Cellular telecommunications systems generally require efficient and reliable handoff procedures to maximize the utilization of system resources. Efficient and reliable handoff procedures are becoming increasingly important as smaller cells are deployed to meet demands for increased communications system capacity. Use of the smaller cells increases the number of cell boundary crossings and frequency assignments thereby increasing the need for efficient and cost-effective handoff mechanisms and procedures.

To facilitate handoff between adjacent cells, a handoff beacon is often employed. A beacon in each cell broadcasts a signal having a limited range about the cell. When a mobile station in a first cell detects a beacon from a second cell, the telephone is handed off to the second cell.

A BTS routes calls between mobile stations within a predetermined geographic area, i.e., cell governed by the BTS, and to and from an MSC and a BSC. The MSC and BSC facilitate the routing of calls between BTSs and between the wireless communications network and the PSTN, i.e., wireline network.

A BSC or MSC is often associated with a particular geographic area comprising one or more cells and often includes various components such as a selector bank subsystem (SBS) and radio link manager (RLM) to facilitate the allocation of network resources between voice calls and other network functions. Network resources may include computer memory, bandwidth, and other hardware and software.

Typically some network resources are assigned to traffic channels and some network resources are assigned to supplemental channels. The use of traffic channels and supplementary channels in wireless telecommunications networks is discussed in IS-95 telecommunications industry standard documentation.

Supplemental channels often carry data such as a file transferred between two wireless computer modems. Fundamental traffic channels often carry voice calls and/or data calls over the wireless network. To improve the quality of a given voice and/or data call, additional supplemental channels may be added to the traffic channel associated with the voice and/or data. The additional supplemental channels increase the throughput of the wireless link between the mobile station and the base station.

When a mobile station, maintaining a call, travels from a first system coverage area associated with a first BSC (or BTS) to a second system coverage area associated with a second BSC (or BTS), the mobile station is handed off to the second BSC (or BTS) and associated BTS(s). If the target BTS associated with the second BSC (or BTS) has insufficient traffic channels to accommodate the handoff, the handoff is typically blocked by a call resource manager (CRM) of the target BTS, and the call is dropped. Hence, when all traffic channels in a BTS are in use, any additional calls handed off to the BTS are typically dropped, and any newly originated calls are typically blocked.

Hence, a need exists in the art for an efficient and cost effective system for reducing dropped or blocked calls due to insufficient traffic channel resources. There exists a further need for an efficient method for allocating and de-allocating traffic channels and supplementary channels.

SUMMARY OF THE INVENTION

The need in the art is addressed by the system for managing wireless communications system resources of the present invention. In the illustrative embodiment, the present invention is implemented in software running on a computer within a base station in a wireless communications system and includes a first mechanism for determining currently available wireless communications system traffic resources and providing a signal in response thereto. A second mechanism de-allocates wireless communications system supplemental resources and reallocates the supplemental resources as traffic resources in response to the signal.

In a specific embodiment, the currently available wireless communications system traffic resources include currently available traffic channels, and the supplemental resources include supplemental channels. The first mechanism includes code for comparing a number of in-use traffic channels with a number of total traffic channels and providing the signal when the difference between the number of total traffic channels and the number of in-use traffic channels is less than a predetermined threshold.

The first mechanism further includes code for monitoring when a call handoff request is blocked at a base station call resource manager and providing the signal when the call is blocked. The second mechanism includes code for sending a message to a selector bank subsystem radio link manager, receiving a response from the selector bank subsystem radio link manager, de-allocating the supplemental resources, and reallocating the supplemental resources as traffic resources.

In the illustrative embodiment, the invention is implemented in software running on a computer within the wireless communications network that strategically controls, via the first and second mechanisms, the allocation of supplemental channels in response to changing network traffic. By strategically controlling the allocation of supplemental channels, the present invention reduces dropped or blocked calls during handoffs, reduces blocked or dropped calls during call origination, and increases the overall reliability of the associated wireless communications system.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
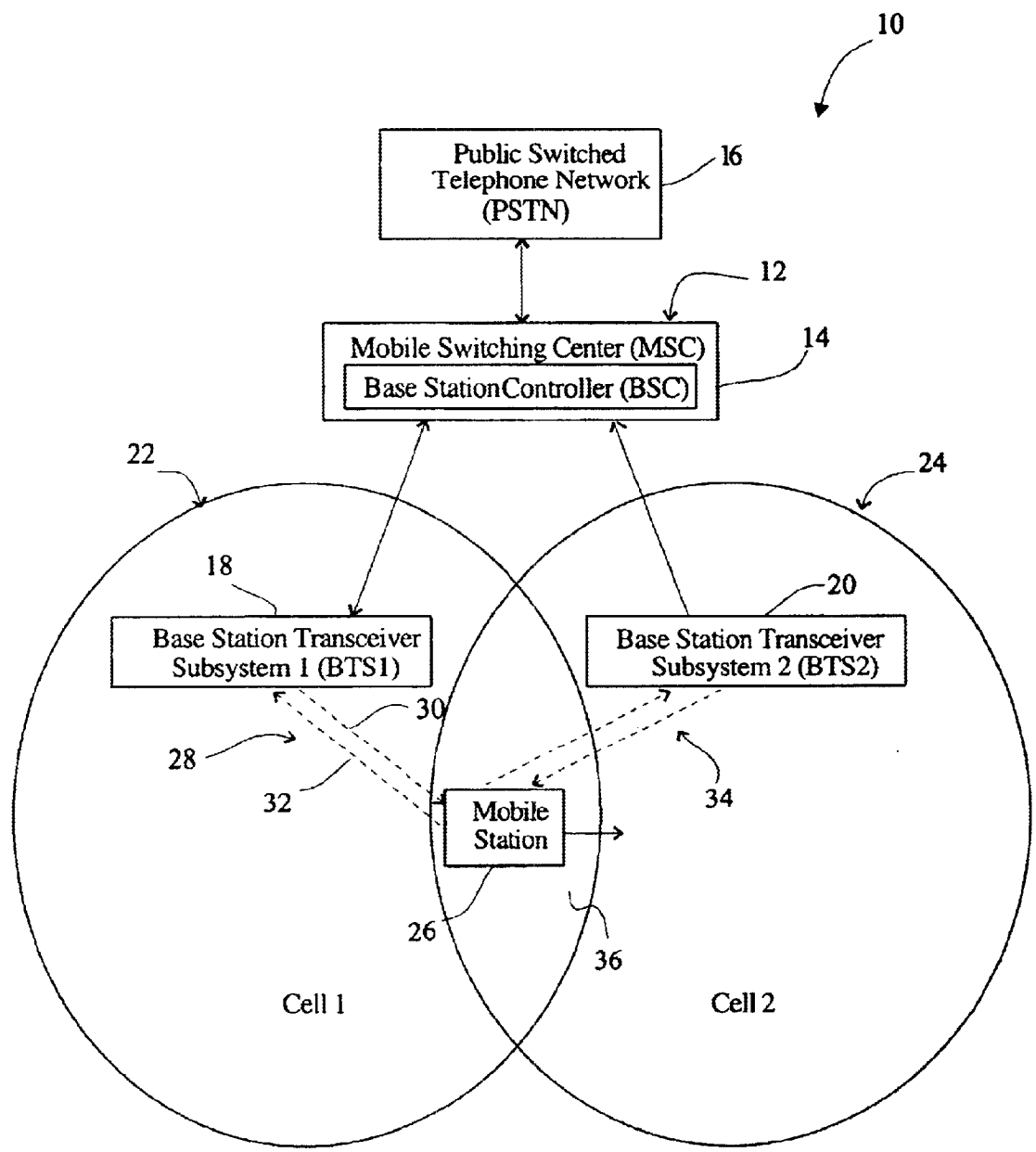
FIG. 1 is a block diagram of an exemplary code division multiple access (CDMA) cellular telephone system for which the present invention is adapted.

FIG. 1 is a block diagram of an exemplary cellular telephone system 10 for which the present invention is adapted. The system 10 includes a mobile switching center (MSC) 12 having a base station controller (BSC) 14. A public switched telephone network (PSTN) 16 routes calls from telephone lines and other networks (not shown) to and from the MSC 12. The MSC 12 routes calls from the PSTN 16 to and from a first BTS 18 and a second BTS 20 associated with a first cell 22 and a second cell 24, respectively. The BTSs 18 and 20 are often called cell controllers.

The MSC 12 routes calls between the BTSs 18 and 20. The first BTS 18 directs calls to the first mobile station 26 within the first cell 22 via a first communications link 28. The communications link 28 is a two-way link having a forward link 30 and a reverse link 32. Typically, when the BTS 18 has established voice communications with the mobile station 26, the link 28 is characterized as a traffic channel. Although each BTS 18 and 20 is associated with only one cell, a BSC is often governs or is associated with several cells.

When the mobile station 26 moves from the first cell 22 to the second cell 24, the mobile station 26 is handed off to the second BTS 20. Handoff typically occurs in an overlap region 36 where the first cell 22 overlaps the second cell 24.

In a soft handoff, the mobile station 26 establishes a second communications link 34 with the target BTS 20 in addition to the first communications link 28 with the source BTS 18. During a soft handoff, both the first link 28 and the second link 34 are maintained simultaneously. After the mobile station 26 has crossed into the second cell 24, it may drop the first communications link 28.

In a hard handoff, the communications link 34 is not established. When the mobile station 26 moves from the first cell 22 to the second cell 24, the link 28 to the source BTS 18 is dropped and a new link is formed with the target BTS 20.

The present invention accommodates several types of call origination and handoff including intersystem handoff and intrasystem handoff. An intersystem handoff occurs when a mobile station operating under the control of a given cellular telecommunications system, such as the system 10, moves outside the coverage area of the telecommunications system and is handed off to an adjacent system (not shown). Intersystem handoff is used when two telecommunication systems are adjacent to one another and the neighboring system is better able to serve the mobile station 26 than the current serving system 10. The neighboring system and the serving system 10 must have contiguous serving areas. Intersystem handoff can take place between two systems using the same air interface or between two systems using two different air interfaces.

Intrasystem handoff occurs when a mobile station moves from one call (BTS) coverage area to another cell coverage area. Intrasystem handoff is often employed in systems having multiple frequencies assigned to some BTSs to efficiently utilize spectrum resources and increase the capacity of the CDMA network. Using multiple frequencies often provides advantages over other methods aimed at capacity increase such as cell splitting or cell sectorization. Intrasystem handoff can also happen between two networks of the same system using two different air interfaces.

In multiple frequency systems, handoff is required when a mobile is moving from an area that has multiple frequencies to an area that has fewer frequencies. Handoff is also required when a mobile station is moving from an area with small load on the serving frequency to an area with high load on the serving frequency and load balancing is required.

Figure 2:
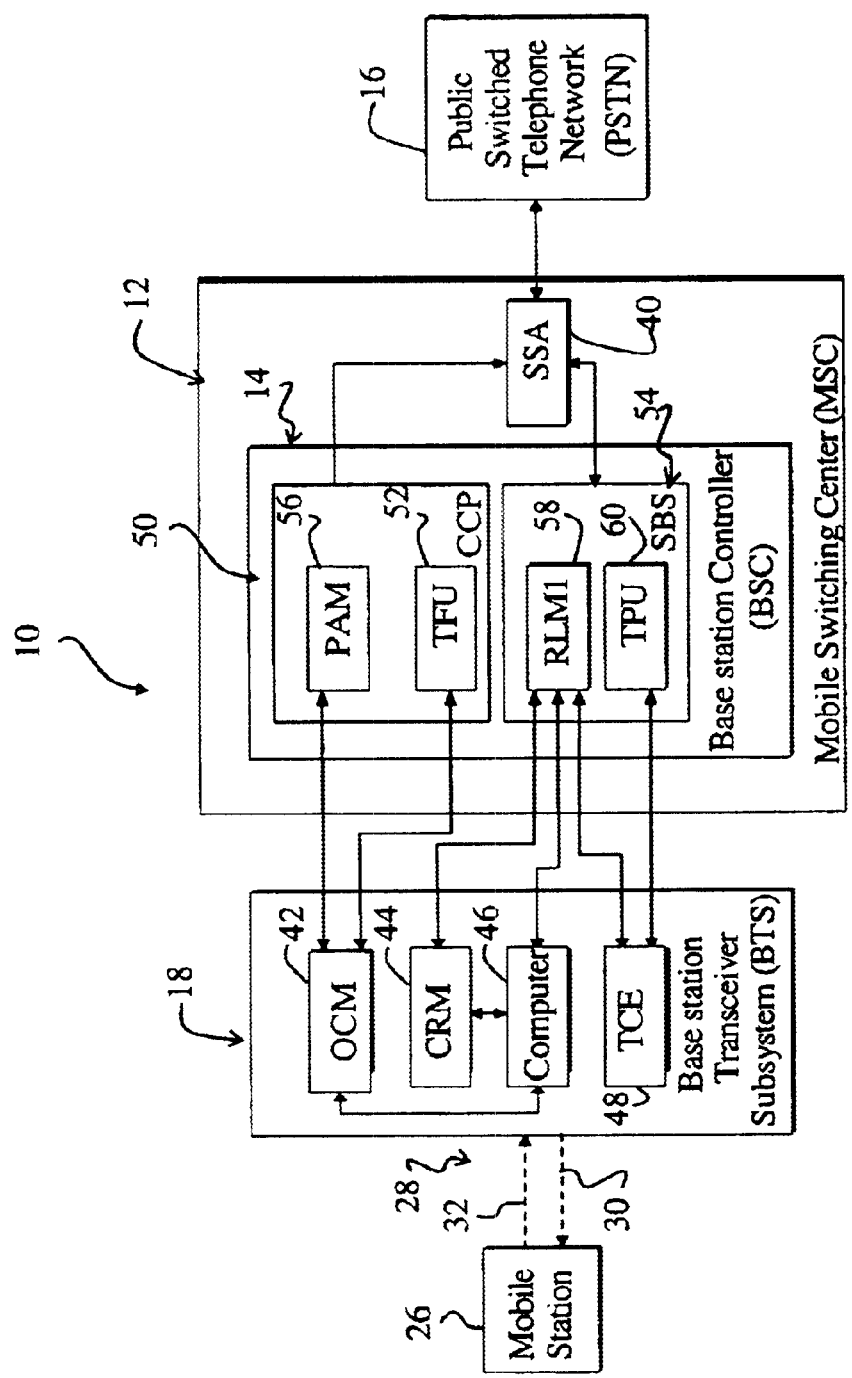
FIG. 2 is a more detailed diagram showing the mobile switching center (MSC), the base station controller (BSC), the first base station transceiver subsystem (BTS), and the mobile station of FIG. 1.

FIG. 2 is a more detailed diagram showing the mobile switching center (MSC) 12, the base station controller (BSC) 14, the first base station (BTS) 18, and the mobile station 26 of FIG. 1. In FIG. 2 the system 10 includes, from left to right, the mobile station 26, the base station 18, the mobile switching center 12 having the base station controller 14 and a supplementary services adjunct (SSA) 40, and the public switched telephone network (PSTN) 16.

The base station 18 has an overhead channel manager (OCM) 42, a call resource manager (CRM) 44, a BTS computer 46 (also known as a BTSC) that includes the OCM 42 and the CRM 44, and a traffic channel element (TCE) 48. The BTS computer 46 controls the OCM 42 and the CRM 44 via software. The MSC 12 includes the BSC 14 and the SSA 40. The SSA 40 may be replaced with a standard mobile switch without departing from the scope of the present invention.

The BSC 14 includes a call control processor (CCP) 50, a time and frequency unit (TFU) 52, and a selector bank subsystem (SBS) 54. The CCP 50 includes a paging and access manager (PAM) 56. The SBS 54 includes a radio link manager (RLM) 58 and a traffic processing unit (TPU) 60. The SSA 40 communicates with the CCP 50, the SBS 54, and the PSTN 16 and acts as a switch to facilitate the routing of calls between the MSC 12 and the PSTN 16.

For clarity, the second base station 20 of FIG. 1 is omitted from FIG. 2. In addition, various other system components are omitted; however, those skilled in the art will know where to obtain these components and how they fit within the system 10. For example, components include a cell site modem in the base station 18 for establishing the air-interface link 28 between the base station 18 and the mobile station 26 and a code division multiple access (CDMA) interconnect subsystem for routing messages from various elements within the base station 18 to various elements within the BSC 14 are omitted.

The OCM 42 in the base station 18 communicates with the PAM 56 and the TFU 52 in the BSC 14. A signaling link between the OCM 42 and the PAM 56 is used for messages, such as mobile station origination messages and messages pertaining to access and registration overload, which are received over an access channel. Messages directed to the mobile station 26 travel from the PAM 56 to the OCM 42, and messages received from the mobile station 26 flow from the OCM 42 to the PAM 56, which is implemented within a selector card interface (not shown). A signaling link between the OCM 42 and the TFU 52 is used for keep-alive messages sent by the TFU 52 to the OCM 42 to indicate a live backhaul connection.

The OCM 42 and the CRM 44 in the BTS 18 are controlled and/or implemented via software running on the BTS computer 46. The BTS computer 46, which includes a microprocessor (not shown), communicates with the RLM 58, which is in the SBS 54 of the BSC 14. The BTS computer 46 also communicates with the RLM 58 and runs unique software constructed in accordance with the teachings of the present invention and, as discussed more fully below, to manage traffic and supplementary resources within the BTS 18.

A signaling link between the CRM 44 and the RLM 58 transfers network operation interface specification (NOIS) messages between the CRM 44 and the RLM 58. NOIS messages are sent from the RLM 58 to the CRM 44 to facilitate call resource allocation and call resource de-allocation. Response messages are sent from the CRM 44 to the RLM 58.

The TCE 48 in the BTS 18 communicates with the RLM 58 and the TPU 60 in the SBS 54 of the BSC 14. A signaling link between the TCE 48 and the RLM 58 transfers NOIS messages between the TCE 48 and the RLM 58 to support traffic resource control operations. A traffic link between the TCE 48 and the TPU 60 transfers traffic messages between the TCE 48 and the TPU 60. The message payload carries reverse link traffic channel frames from the TCE 48 to the TPU 60 and forward link traffic channel frames from the TPU 60 to the TCE 48. Frame quality and power control information is also appended to the messages. The messages are constructed in accordance with the IS-95A standard.

The computer 46 runs software to selectively allocate and de-allocate traffic channels and supplementary channels based on total traffic resources, supplementary resources, and total currently available resources. For example, the computer 46 monitors allocation of channels within the TCE 48 via the CRM 44 and the RLM 58 and maintains a traffic channel threshold and a supplementary channel threshold. If the number of remaining traffic channels not currently in use drops below the traffic channel threshold, in-use supplementary channels are de-allocated and reallocated as traffic channels via a series of messages transferred between the CRM 44, the RLM 58, and the TCE 48 (as discussed more fully below). Supplementary channels are de-allocated until the number of available traffic channels exceeds the traffic channel threshold. Also, the supplemental channels that are not currently in use may be used as traffic channels.

If the number of remaining traffic channels becomes less than the supplementary channel threshold, supplementary channels will cease being allocated and instead will be reserved for traffic channel use. The actual values for the traffic channel threshold and the supplementary channel threshold are application-dependent, and those having ordinary skill in the art will easily be able to choose appropriate values to meet the needs for a given application.

Alternatively, supplementary resources may be de-allocated at the last minute to avoid a dropped call during a handoff procedure. For example when a handoff request for a call is blocked at the CRM 44, the unique software running on the computer 46 may check the number of supplemental channels currently in use at the TCE 48 via the RLM 58 or CRM 44. If the call was blocked at the CRM 44 due to insufficient traffic channel resources, the software initiates a resource release request to be sent from the CRM 44 to the RLM 58 requesting that the RLM 58 release supplementary channel resources at the TCE 48.

In the present specific embodiment, before implementing the above steps, the software running on the computer 46 estimates a time required for a resource release request to be sent from the CRM 44 to the RLM 58, a response to be sent back to the CRM 44 for the supplementary channels to be de-allocated at the TCE 48 and reallocated as traffic channels at the TCE 48 for an appropriate number of supplementary channels. If the time required is likely to cause a dropped call due to a timing problem, the method is aborted.

The present invention is adapted for use with medium data rate (MDR) features. The medium data rate (MDR) IS-95 standard and associated features aims to increase data throughput without changing infrastructure hardware. This is achieved by permitting a single subscriber to use up to 8 code channels on the forward link 30 and up to 8 code channels on the reverse link 32. Additional code channels, termed supplemental channels or supplementary channels, may be assigned to a data mobile station such as a computer modem.

A supplemental code channel is either transmitted at full rate (9600 bps for Rate Set 1 or 14400 bps for Rate Set 2) or not transmitted at all. It must use the same rate set as the fundamental code channel. It may carry primary traffic or secondary traffic, but not both (i.e., no dim-and-burst). No signaling traffic is sent on the supplemental code channel. When neither primary nor secondary traffic is available, the base station 18 shall not transmit the forward supplemental code channels. In addition, supplemental code channels do not have a reverse link power control sub-channel (no code puncturing), which gives some performance improvement. Supplemental code channels have the same frame offset as the associated fundamental channel.

A fundamental code channel is put in soft handoff using methods known in the art and used for voice calls. Whenever the fundamental code channel is put in soft handoff, the associated supplemental code channels are also put in soft handoff. Supplemental code channel symmetry must be achieved between the base stations. If there are not enough resources for all the supplemental code channels on the new base station or BSC, some channels will be released by the requestor base station or BSC.

A forward link allows up to eight code channels to be combined together to provide up to eight times the current maximum data rate. These code channels are the forward traffic channels defined in the IS-95A standard and are discriminated by Walsh codes assigned by the base station 18. The forward traffic channels are divided into two types: the fundamental code Channel and the associated supplement code channels.

A fundamental code channel is assigned to the mobile station 26 for a data call. A fundamental code channel is a standard forward traffic channel that is transmitted at variable data rate. The fundamental code channel may carry primary traffic, secondary traffic, or signaling traffic. The fundamental code channel also has a reverse link power control sub-channel as defined in IS-95A.

In the preferred embodiment, the CRM 44 has a threshold of remaining TCEs established via the computer 46, below which it will request the SBS 54 to de-allocate supplemental channels. For example, if the base station 18 has a total of 60 TCEs (not shown) and the de-allocation request threshold is 55 TCEs, when the number of remaining TCEs reaches below 5 (60–55), the CRM 44 will send a request to the RLM 58 corresponding to its first supplemental channel for a resource release (as discussed more fully below). Thus, for example, a 60 TCE system could have 20 supplementals allocated first, followed by 35 fundaments and supplementals. When the number of remaining TCEs reach 5, the CRM 44 starts requesting de-allocation of the supplementals.

The de-allocation request threshold does not necessarily correspond to the supplemental blocking threshold for the TCEs. If for example, the CRM 44 has a supplemental blocking threshold that is x, and a de-allocation request threshold as y (y>x), the allocation of supplemental channels will be blocked after x TCEs are in use. An attempt to de-allocate supplemental channels is made when the remaining traffic resources fall below y. The de-allocation request is triggered only during a resource allocation by the CRM 44.

In the event of a soft handoff request for a fundamental channel, the CRM 44 maintains information specifying whether or not a particular TCE is handling a fundamental or a supplemental code channel.

In general, supplemental channels are de-allocated before an associated fundamental channel is de-allocated. If the SBS 54 does not de-allocate supplemental channels before fundamental channels, the base station 18 can de-allocate the supplemental channels or wait for a dangling resource to de-allocate the channels.

For a soft handoff, the CRM 44 allocates supplemental channels requested in a CRMRLM resource request message, i.e., a CRMRLM_ResourceRelReq message.

For a softer handoff, the CRM 44 places allocated channel elements in softer handoff. Additional supplemental channel elements are not allocated for a softer handoff.

Figure 3:
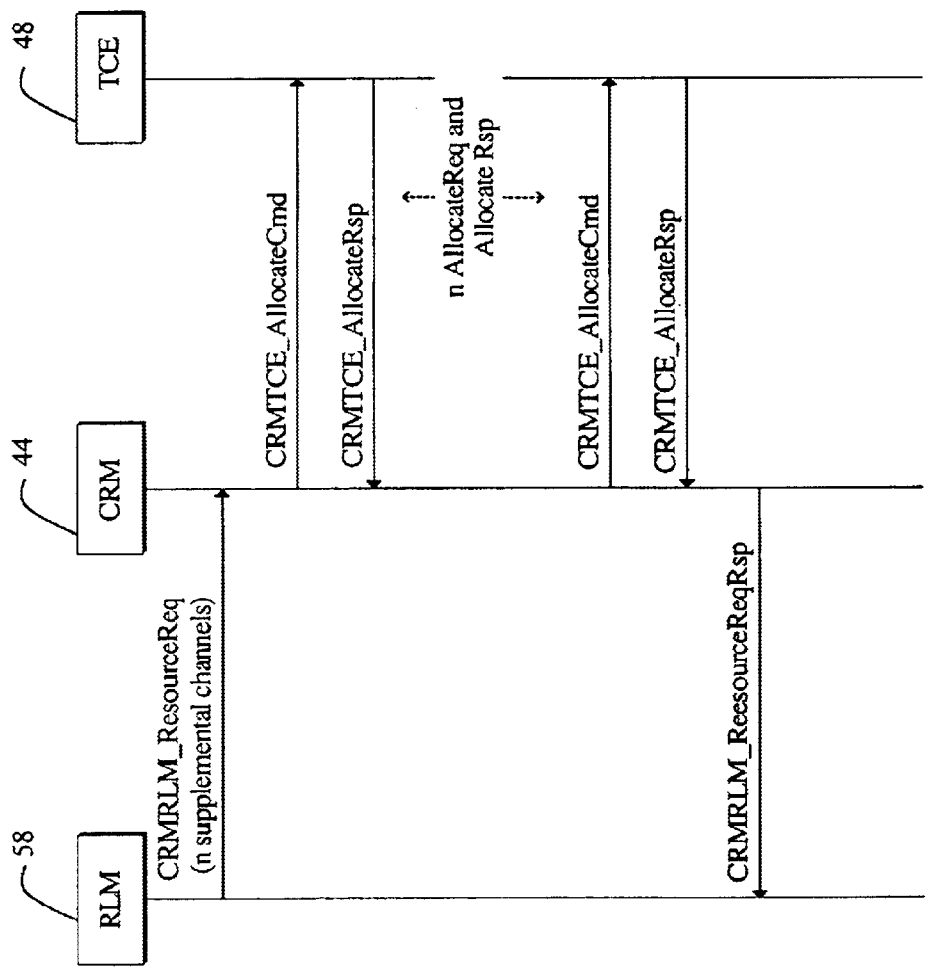
FIG. 3 is a ping-pong diagram illustrating messages exchanged between the RLM, CRM, and the TCE of FIG. 2 to set up a call in accordance with the to teachings of the present invention.

FIG. 3 is a ping-pong diagram illustrating messages exchanged between the RLM 58, CRM 44, and the TCE 48 of FIG. 2 to set up a call in accordance with the teachings of the present invention. To assign supplemental channels to a call, the RLM 58 sends a CRMRLM_ResourceReq message to the CRM 44 requesting a release of n supplementary channels. In response to the CRMRLM_ResourceReq message, the CRM 44 sends a CRMTCE_AllocateCmd message to the TCE 48 commanding the TCE 48 to release a supplemental channel. The TCE 48 responds with a CRMTCE_AllocateRsp message indicating that the supplementary channel was released. n CRMTCE_AllocateCmd messages and n CRMTCE_AllocateRsp messages are exchanged between the CRM 44 and the TCE 48, one for each supplementary channel released.

After the message exchange between the CRM 44 and the TCE 48, the CRM 44 sends a CRMRLM_ResourceRelRsp message to the RLM 58 informing the RLM 58 that n supplementary channels were allocated.

With access to the present teachings, those skilled in the art can easily construct the messages of FIG. 3. The following discussion of changes required to IS-95 to accommodate messages exchanged between the RLM 58 and the CRM 44 is intended to facilitate an understanding of the present invention.

For the CRMRLM_CRMResourceReq message, changes are required to allow the RLM 58 to request multiple resources from the TCE 48 in one resource request message. A CRMResourceReqType field is still used to specify why the resources are needed (e.g. handoff, origination, etc.). For example, if resources for one fundamental channels, termed fundamentals, and 5 forward supplementary channels, termed supplementals, are requested for handoff, the CRMResourceReqType field is set to _HANDOFF, the FundamentalIncluded field is set to TRUE, and the NumFwdSupChannelsRequested is set to 5.

Alternatively, if resources for 3 forward supplementals are requested by the RLM 58 to increase the data throughput of a medium data rate (MDR) call, the CRMResourceReqType field is set to _ORIGINATION, the FundamentalIncluded field is set to FALSE, and the NumFwdSupChannelsRequested is set to 3.

The field FundamentalFwdTrafficGain is used by the CRM 44 to predict the forward power requirements of requested supplemental channels of type _ORIGINATION for admission control purposes. The fields ForwardRateSet and ReverseRateSet have been added to support IS-95C.

Table 1 illustrates changes to the CRMRLM_CRMResourceReq network operation interface specification (NOIS) message.

TABLE 1

| Parameter | Type | Comments/description |
|---|---|---|
| CallId | M | A unique 64-bit tag associated with a call event. This tag follows the call and is used to mark resources that are allocated to it in the various subsystems. It includes: SID, EntryPoint, Count, Time. |
| IMSI | O | |
| TransactionId | M | Indicates the transaction identifier for the current request-response pair and is used to correlate the response with the request. It is incremented every time a request is made for a given CallId. |
| CRMResourceRequest Type | M | Enumeration: _ORIGINATION or _HANDOFF. |
| CellId | O | Mandatory if ExtendedBaseId is omitted. It includes: CellNumber, SectorId. Always present in S/W Rel. 3.5. |
| ExtendedBaseId | O | Mandatory if CellId is omitted. It includes: BAND_CLASS, CDMA_FREQ, CellNumber, SectorId. Never used in S/W Rel. 3.5. |
| FRAME_OFFSET | O | Mandatory when the request type is HANDOFF and must be the same for all TCES 48 carrying involved in the same call. It must be omitted otherwise. |
| EnableTA | O | Set equal to 1 only when the temporal analyzer is enabled for this call. |
| CallLogging | O | Set equal to 1 only when diagnostic logging is enabled for this call. |
| FundamentalIncluded | M | Explicit Boolean. Enumeration: TRUE: Fundamental requested FALSE: Fundamental not requested |
| NumFwdSupChannels | O | Integer of ACLRL_NumSupChannelType |

TABLE 1-continued

| Parameter | Type | Comments/description |
|---|---|---|
| NumRvsSupChannels | O | ACLRL_MaxNumSupChannels = 0x07 Integer of ACLRL_NumSupChannelType ACLRL_MaxNumSupChannels = 0x07 |
| FundamentalFwd TrafficGain | O | included in forward supplemental originations only: the full-rate forward link traffic channel gain of the fundamental associated with the supplemental code channel requested. |
| ForwardRateSet | O | Forward Rate Set, ranges from 1 to 6. |
| ReverseRateSet | O | Reverse Rate Set, ranges from 1 to 6. |

The CRMRLM_CRMResourceRsp Message has been extended to allow any combination of fundamental, forward supplemental or reverse supplemental channels to be granted in the same message. The existing fields of the message are used to allocate the fundamental, and five new fields are added to specify the forward and reverse supplementals.

Table 2 illustrates required changes to the CRMRLM_ResourceRsp NOIS message.

TABLE 2

| Parameter | Type | Comments/description |
|---|---|---|
| CallId | M | A unique 64-bit tag associated with a call event. This tag follows the call and is used to mark resources that are allocated to it in the various subsystems. It includes: SID, EntryPoint, Count, Time. |
| TransactionId | M | It must match the TransactionId used for the corresponding resource request. |
| CRMResource RequestStatus | M | Enumeration: RESRC_ALLOCATED, RESRC_NOT_ALLOCATED, CRM_NOT_READY (not used), REJECT_BAD_BASE_ID, CSM_REJECT |
| ExtendedBaseId | O | Always used. In the case of the 6-sector BTS, with 2*3 frequency/sectors configuration, its CellId portion can be set differently from what received in the resource request; this happens in case CEs are not available in the cluster associated with the frequency requested by the RLM 58, and to route the call setup to the other frequency where resources are available. |
| SectorList | O | Used when the corresponding resource request type is HANDOFF and the CRM 44 establishes that it is a softer handoff. It lists the ExtendedBaseId's of all sectors in softer handoff for this CallId. Omitted if it is of the type ORIGINATION. |
| ACNNodeId | O | Omitted if the resource request type is HANDOFF and SectorList count is ≦3 (maximum number of links in softer handoff that can be supported by the CSM). Mandatory otherwise. |
| CODE_CHAN | O | Mandatory when the request status is ALLOCATED. |
| FRAME_OFFSET | O | Mandatory when the request type is ORIGINATION. Omitted if it is of the type HANDOFF. |
| TCERLMLinkVersion | O | Although optional, it is always included. |
| Fundamental Included | M | Enumeration: TRUE: Fundamental allocated FALSE: Fundamental not allocated |
| FwdSupChannelList | M | Includes NumFwdSupChannels and a list of Code Channels and ACNNodeId |
| RvsSupChannelList | O | Includes NumRvsSupChannels and a list of ACNNodeId |

TABLE 2-continued

| Parameter | Type | Comments/description |
|---|---|---|
| FwdSupChannelList | | |
| NumFwdSupChannels | O | Integer of ACLRL_NumSupChannelType ACLRL_MaxNumSupChannels = 0x07 |
| CODE_CHAN | O | This parameter must be repeated exactly NumFwdSupChannels times |
| ACNNodeId | O | This parameter must be repeated exactly NumFwdSupChannels times |
| RvsSupChannelList | | |
| NumRvsSupChannels | O | Integer of ACLRL_NumSupChannelType ACLRL_MaxNumSupChannels = 0x07 |
| ACNNodeId | O | This parameter must be repeated exactly NumFwdSupChannels times |

The CRMRLM_CRMResourceReleaseReq Message has also been generalized to allow the release of any combination of fundamental, forward supplemental and/or reverse supplementals. If a forward supplemental channel is released, the inclusion of the fundamental forward gain allows the CRM 44 to estimate how much forward power might become available for other users in that sector.

Table 3 illustrates changes required to the RMRLM_CRMResourceReleaseReq NOIS message.

TABLE 3

| Parameter | Type | Comments/description |
|---|---|---|
| CallId | M | A unique 64-bit tag associated with a call event. This tag follows the call and is used to mark resources that are allocated to it in the various subsystems. It includes: SID, EntryPoint, Count, Time. |
| TransactionId | M | It indicates the transaction identifier for the current request-response pair and is used to correlate the response with the request. It is incremented every time a request is made for a given CallId. |
| ExtendedBaseId | M | |
| TCELinkStatus | M | Enumeration: VALID, NOT_VALID. |
| Fundamental Included | M | Enumeration: TRUE: Fundamental should also be released. FALSE: Fundamental should not be released. |
| FwdSupChannels | O | It includes NumFwdSupChannels and a list of ACNNodeId |
| RvsSupChannels | O | It includes NumRvsSupChannels and a list of ACNNodeId |
| FwdSupChannels | | |
| NumFwdSupChannels | O | Integer of ACLRL_NumSupChannelType ACLRL_MaxNumSupChannels = 0x07 |
| ACNNodeId | O | This parameter must be repeated exactly NumFwdSupChannels times |
| RvsSupChannels | | |
| NumRvsSupChannels | O | Integer of ACLRL_NumSupChannelType ACLRL_MaxNumSupChannels = 0x07 |
| ACNNodeId | O | This parameter must be repeated exactly NumFwdSupChannels times |

Figure 4:
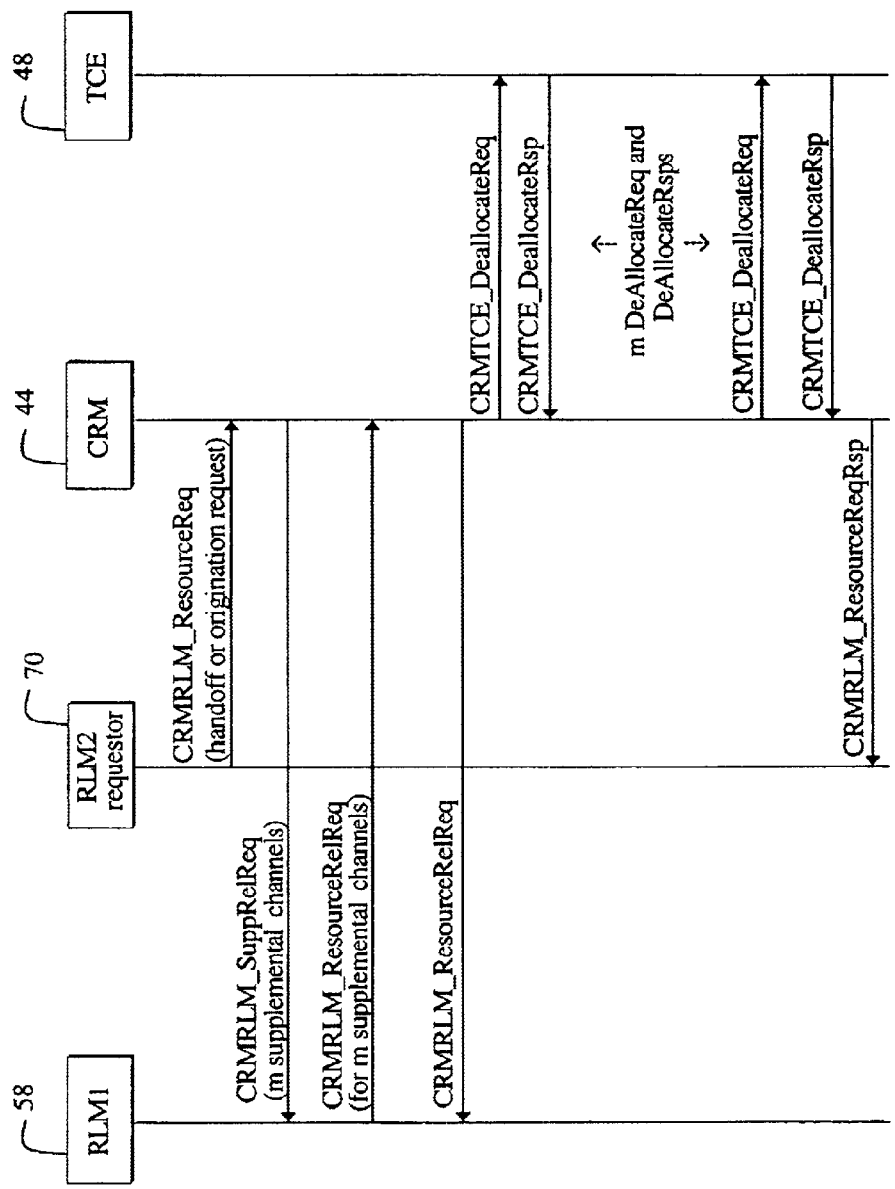
FIG. 4 is a ping-pong diagram illustrating messages exchanged between the radio link manager (RLM), the call resource manager (CRM), and the traffic channel element (TCE) of FIG. 2 to facilitate mobile station mobility according to the present invention.

FIG. 4 is a ping-pong diagram illustrating messages exchanged between the RLM 58 the CRM 44, and the TCE 48 of FIG. 2 to facilitate mobile station handoff between a requester communications system (not shown) that includes a requestor BSC (not shown) having a requestor RLM (RLM2) 70.

Initially, the requestor RLM 70 transfers a CRMRLM_ResourceReq message, i.e., a handoff message to the CRM 44. Conventionally, if the CRM 44 did not have sufficient resources to accept the handoff, the call being handed off would be dropped, i.e., blocked at the CRM 44. In the present specific embodiment detailed in FIG. 4, if the CRM 44 determines that insufficient traffic resources such as fundamental channels are available to accept the handoff, a CRMRLM_SuppRelReq to release m supplementary channels is sent to the RLM 58. The RLM 58 subsequently sends a CRMTCE_ResourceRelReq message to the CRM 44 directing the CRM 44 to release m supplementary channels from the TCE 48. The CRM 44 acknowledges the receipt of the message in a CRMTCE_ResourceRelRsp to the RLM 58 and subsequently sends a CRMTCE_DeallocateReq message to the TCE 48 requesting that the TCE 48 de-allocate a supplementary channel so that it may be used for traffic channels. The TCE 48 responds with a CRMTCE_DeallocateRsp indicating that a supplementary channel was de-allocated. The CRM 44 and the TCE 48 exchange m CRMTCE_DeallocateReq messages and m CRMTCE_DeallocateRsp messages, one for each m supplemental that is de-allocated. After the m supplemental channels are de-allocated, the CRM 44 sends a CRMRLM_ResourceReqRsp response message back to the requester RLM 70 indicating that the handoff can now be completed.

With access to the present teachings, those skilled in the art can construct the messages of FIG. 4.

Figure 5:
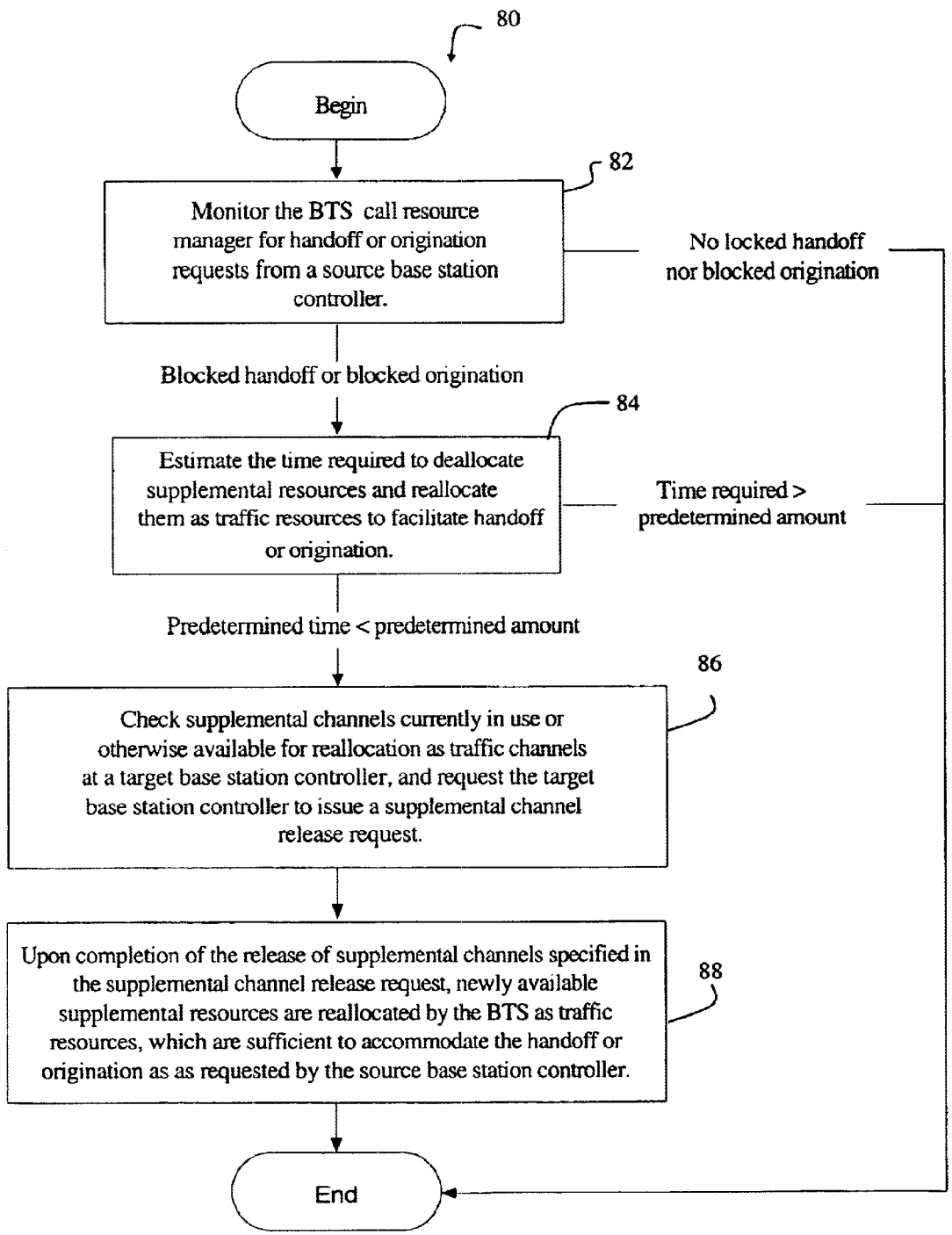
FIG. 5 is a flow diagram of a method for strategically allocating supplemental channels to reduce dropped calls during handoff or origination implemented within the BTS and BSC of FIG. 2.

FIG. 5 is a flow diagram of a method 80 for strategically allocating supplemental channels to reduce dropped calls during handoff implemented within the base station controller 54 of FIG. 2. The method 80 is implemented by software running on the computer 46 of FIG. 2.

With reference to FIGS. 2 and 5, in an initial monitoring step 82, the CRM 44 is monitored for blocked handoff or call origination requests from a source BSC (not shown). If the CRM 82 does not block the call associated with the handoff request, the method 80 is complete. If the CRM 44 blocks the call, control is passed to an estimation step 84, where the time required to de-allocate supplemental resources and reallocate them as traffic resources is estimated in accordance with procedures known in the art. If the time required is less than a predetermined amount, control is passed to a resource management step 86. The predetermined amount of time is application-specific and roughly corresponds to the time after which the call is likely to be dropped due to a time-out condition.

In the resource management step 86, the number of supplemental channels currently in use or otherwise available for reallocation as traffic channels at the target BSC 14 is checked. The software subsequently causes the target BSC 14 to generate a supplemental channel release request.

In a subsequent resource releasing step 88, supplemental channels are released in accordance with the supplemental channel release request by the target BSC 14. Newly available supplemental resources may then be reallocated as needed by the BTS CRM 44 as traffic resources to facilitate handoff or call origination.

In summary, the method 80 involves checking the supplemental channels currently in use or otherwise available for reallocation as traffic channels at a target BSC; requesting the target BSC to issue a supplemental channel release request, upon completion of which the associated target BTS CRM can reallocate the available supplemental resources as traffic resources that are sufficient to accommodate the handoff or origination as requested by the source BSC.

Figure 6:
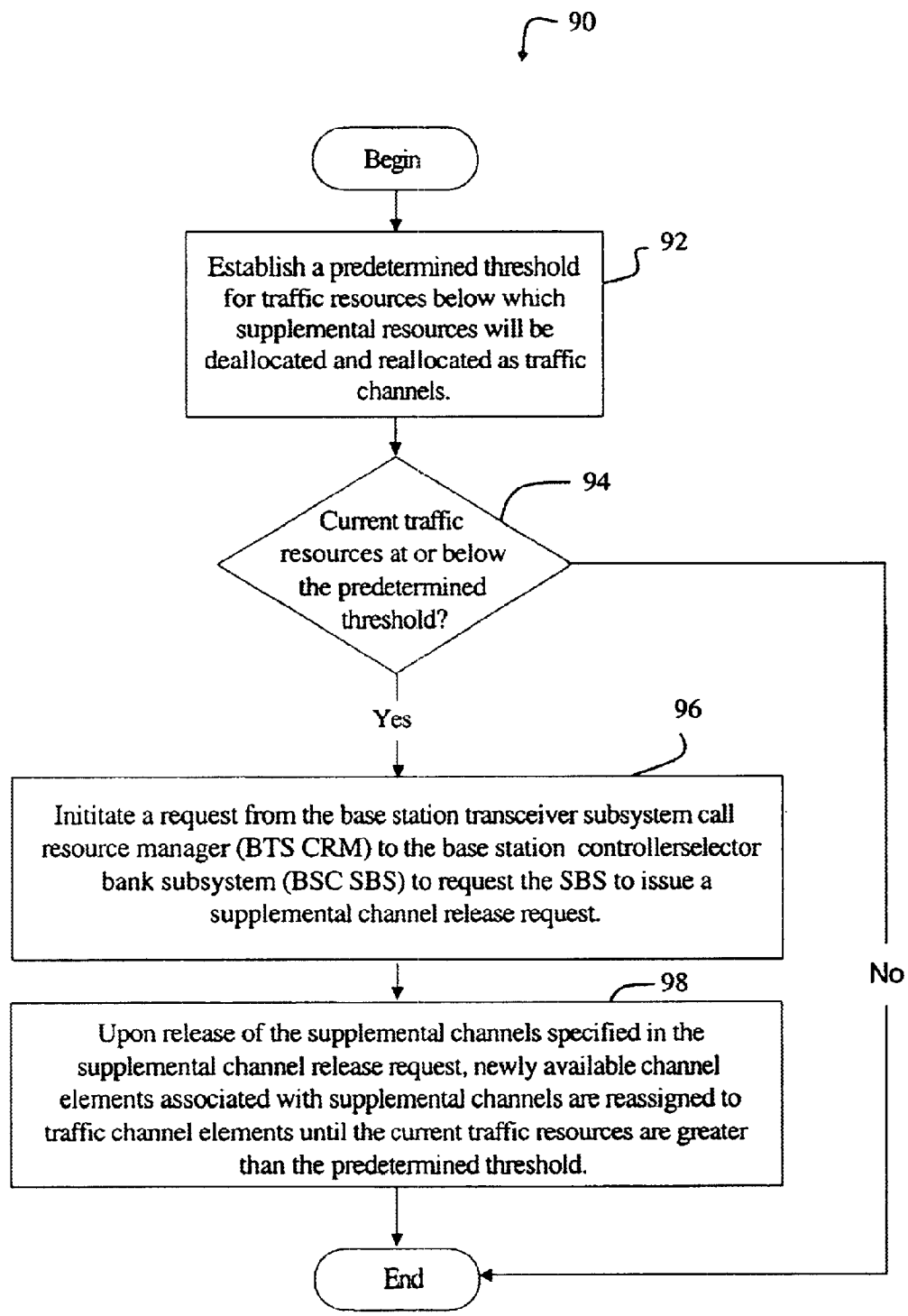
FIG. 6 is a flow diagram of a method for allocating supplemental channels and traffic channels according to the present invention.

FIG. 6 is a flow diagram of a method 90 for allocating supplemental channels and traffic channels according to the present invention. With reference to FIGS. 2 and 6, initially, in a threshold-establishing step 92, a threshold is established for traffic resources. Control is then passed to a traffic resource-checking step 94 where currently available traffic resources are monitored. If currently available traffic resources are greater than the threshold, then the method 90 is complete. If available traffic resources drop below the threshold, control is passed to a resource allocation step 96, where a request is initiated from the target BTS CRM 44 to the BSC SBS 54 requesting that the BSC SBS 54 issue a supplemental channel release request to the target BTS 18.

Control is subsequently passed to a supplemental resource releasing step 98, where supplemental resources at the BTS 18 are de-allocated in accordance with the supplemental channel release request from the BSC SBS 54. Newly available channel elements associated with the released supplemental channels are converted to traffic channel elements until the current traffic resources are greater than the predetermined threshold.

In summary, the method 90 involves initiating a request from a target BTS CRM to an associated BSC SBS requesting that the BSC SBS issue a supplemental channel release request to the BTS, upon completion of which the target BTS can reassign channel elements associated with the supplemental channels to traffic channel elements until the current traffic resources are greater than a predetermined threshold.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for reducing dropped calls in a wireless communications network comprising:
   means for determining currently available wireless communications system traffic resources;
   means for estimating that a time required for a request for release of supplemental resources to be sent, a response to be sent back, for supplemental resources to be de-allocated and reallocated as traffic channels will not cause a dropped call;
   means for transmitting said request for release of supplemental resources in response to determining currently available wireless communications system traffic resources; and
   means for selectively de-allocating wireless communications system supplemental resources and providing said supplemental resources for use as traffic resources in response to said request for release of supplement resources.

2. The system of claim 1 wherein said currently available wireless communications system traffic resources include currently available traffic channels.

3. The system of claim 1 wherein said wireless communications system supplemental resources include supplemental channels.

4. The system of claim 1 wherein said means for determining includes means for comparing a number of used traffic channels with a number of total traffic channels and providing said request when the difference between said number of total traffic channels and said number of used traffic channels is less than a threshold.

5. The system of claim 1 wherein said means for determining includes means for monitoring when a call handoff request and/or a call origination request is blocked at a base station transceiver subsystem call resource manager and providing said request when said call is blocked.

6. The system of claim 5 wherein said means for selectively de-allocating includes means for sending a message to a selector bank subsystem radio link manager, receiving a first response from said selector bank subsystem radio link manager, requesting a de-allocation of said supplemental resources, and upon completion of de-allocation in response to said de-allocation request, reallocating said supplemental resources as traffic resources by controlling corresponding traffic channel elements.

7. The system of claim 6 further including means for estimating said time required by said means for sending said request, receiving said response, de-allocating said supplemental resources, and reallocating said supplemental resources, and disabling said means for sending said request if said time is larger than a predetermined time.

8. The system of claim 6 wherein said means for selectively de-allocating includes software running on a base station transceiver subsystem.

9. The system as in claim 1, further comprising:
means for selectively de-allocating wireless communications system supplemental resources and providing said supplemental resources for use as traffic resources as a function of the currently in-use supplemental resources and the estimated time.

10. The system as in claim 1, further comprising:
means for determining currently in-use supplemental resources.

11. The system as in claim 10, wherein said means for selectively de-allocating wireless communications system supplemental resources further comprises:
means for selectively de-allocating wireless communications system fundamental resources and providing said fundamental resources for use as traffic resources.

12. The system as in claim 1, further comprising:
means for determining currently in-use supplemental resources, wherein said means for selectively de-allocating wireless communications system supplemental resources and providing said supplemental resources for use as traffic resources further comprises:
means for selectively de-allocating wireless communications system supplemental resources and providing said supplemental resources for use as traffic resources as a function of the currently in-use supplemental resources.

13. A system for managing traffic resources and supplementary resources in a wireless communications system comprising:
means for maintaining a predetermined threshold for traffic resources;
means for determining if currently available traffic resources are below said threshold and providing a request for release of supplemental resources in response thereto;
means for estimating that a time required for said request for release of supplemental resources to be sent, a response to be sent back, for supplemental resources to be de-allocated and reallocated as traffic channels will not cause a dropped call; and
means for de-allocating in-use supplementary resources and reallocating said supplementary resources as traffic resources so that said traffic resources are above said threshold in response to said request.

14. The system of claim 13 wherein said means for de-allocating includes means for initiating a request from a call resource manager in a base station transceiver subsystem to a selector bank subsystem within a base station controller governing said wireless communications system to reassign channel elements associated with supplemental channels to traffic channel elements.

15. A method for reducing dropped calls in a wireless communications network comprising the steps of:
determining currently available wireless communications system traffic resources and providing a request for release of supplemental resources in response thereto;
estimating a time required for a request for release of supplemental resources to be sent, a response to be sent back, for supplemental resources to be de-allocated and reallocated as traffic channels; and
selectively de-allocating wireless communications system supplemental resources and reallocating said supplemental resources as traffic resources in response to said request.

16. The method of claim 15, wherein said currently available wireless communications system traffic resources include currently available traffic channels.

17. The method of claim 15, wherein said wireless communications system supplemental resources include supplemental channels.

18. The method of claim 15, wherein said determining includes comparing a number of used traffic channels with a number of total traffic channels and providing said request when the difference between said number of total traffic channels and said number of used traffic channels is less than a threshold.

19. The method of claim 15, wherein said determining includes monitoring when a call handoff request and/or a call origination request is blocked at a base station transceiver subsystem call resource manager and providing said signal when said call is blocked.

20. The method of claim 15, where said selectively de-allocating includes sending a message to a selector bank subsystem radio link manager, requesting a de-allocation in response to said de-allocation request, reallocating said supplemental resources as traffic resources by controlling corresponding traffic channel elements.

21. The method of claim 20 further comprising disabling said sending a message if said estimated time is larger than a predetermined time.

22. A method for managing traffic resources and supplementary resources in a wireless communications system, comprising:
maintaining a threshold for traffic resources;
determining if currently available traffic resources are below said threshold and providing a signal in response thereto;
estimating a time required for a request for release of in-use supplemental resources to be sent, a response to be sent back, for in-use supplemental resources to be de-allocated and reallocated as traffic channels; and
de-allocating in-use supplementary resources and reallocating said supplementary resources as traffic resources so that said traffic resources are above said threshold in response to said signal.

23. The method of claim 22, wherein said de-allocating includes initiating a request from a call resource manager in a base station transceiver subsystem to a selector bank subsystem within a base station controller governing said wireless communication system to reassign channel elements associated with supplemental channels to traffic channel elements.

24. A base station, comprising:

a call resource manager that receives a request for release of a supplemental channel, receives a time estimate for a request for release of the supplemental channel to be sent, a response to be sent back, for the supplemental channel to be de-allocated and reallocated as a traffic channel; and if the time estimate is above a predetermined value, commands a release of the supplemental channel, receives a response indicating release of the supplemental channel, and sends a response message indicating allocation of the released supplemental channel.

25. The base station of claim 24 further comprising an overhead channel manager that manages access and registration messages.

26. A base station, comprising:

a call resource manager that receives a handoff message from a first mobile station, receives a time estimate for a request for release of supplemental channels to be sent, a response to be sent back, for the supplemental channels to be de-allocated and reallocated as traffic channels; sends a first release m supplemental channels ($m \geq 1$) message to a second mobile station, receives a second release m supplemental channels message from the second mobile station, sends to the second mobile station, a response message to the second release m supplemental channels message, sends a de-allocate request message requesting de-allocation of a m supplemental channels, receives a de-allocate response message for every supplemental channel indicating a supplemental channel was de-allocated, and sends a resource response message to the first mobile station indicating the m supplemental channels were de-allocated; and a traffic channel element that allocates and releases the m supplemental channels.

* * * * *